United States Patent
Oki et al.

(10) Patent No.: US 9,010,226 B2
(45) Date of Patent: Apr. 21, 2015

(54) BREAD CONVEYING APPARATUS AND BREAD SLICING APPARATUS

(75) Inventors: Yuzuru Oki, Chigasaki (JP); Masami Umetsu, Yokohama (JP); Takahiro Hasegawa, Fujisawa (JP)

(73) Assignee: Oshikiri Machinery Ltd., Fujisawa-Shi, Kanagawa-Ken (JP)

(*) Notice: Subject to any disclaimer, the term of this patent is extended or adjusted under 35 U.S.C. 154(b) by 565 days.

(21) Appl. No.: 12/968,062

(22) Filed: Dec. 14, 2010

(65) Prior Publication Data

US 2011/0296966 A1    Dec. 8, 2011

(30) Foreign Application Priority Data

Jun. 7, 2010   (JP) .................................. 2010-130433

(51) Int. Cl.
| | |
|---|---|
| B26D 7/00 | (2006.01) |
| B26D 7/06 | (2006.01) |
| B23D 55/04 | (2006.01) |
| B26D 1/46 | (2006.01) |
| B65G 19/10 | (2006.01) |
| B65G 47/08 | (2006.01) |
| B26D 7/32 | (2006.01) |

(52) U.S. Cl.
CPC ............ *B26D 7/0625* (2013.01); *B23D 55/043* (2013.01); *B26D 1/46* (2013.01); *B26D 2007/327* (2013.01); *B65G 19/10* (2013.01); *B65G 47/082* (2013.01)

(58) Field of Classification Search
CPC .... B23D 53/005; B23D 55/04; B23D 55/043; B23D 55/046; B23D 7/0625; B23D 1/46; B23D 2007/327; A21C 14/00; B65G 19/10; B65G 47/082

USPC ........ 83/407, 418, 437.2, 409, 409.1, 435.15, 83/435.2, 425, 425.2, 45.3; 198/812, 198/861.1, 717, 732
See application file for complete search history.

(56) References Cited

U.S. PATENT DOCUMENTS

| | | | | |
|---|---|---|---|---|
| 214,811 | A | * | 4/1879 | Chapman ...................... 198/732 |
| 2,247,693 | A | * | 7/1941 | Papendick ..................... 83/407 |

(Continued)

FOREIGN PATENT DOCUMENTS

| | | |
|---|---|---|
| JP | 63-21 A | 1/1988 |
| JP | 6-278853 A | 10/1994 |

(Continued)

OTHER PUBLICATIONS

Notice of Reasons for Refusal dated Apr. 22, 2014, with English translation.

*Primary Examiner* — Sean Michalski
(74) *Attorney, Agent, or Firm* — McGinn IP Law Group, PLLC

(57) ABSTRACT

A bread conveying apparatus and a bread slicing apparatus including the bread conveying apparatus, comprise a flight conveyer including a first flight for urging a bread, an endless revolving member on which the first flight is mounted, and a driving member and a driven member, the endless revolving member being wound around the driving member and driven member; a rail extending along a conveying path of the bread and supporting the first flight; and a rail size setting unit for setting a length of the rail with respect to an extending direction of the conveying path, wherein the length of the rail with respect to the conveying direction is set by the rail size setting unit based on a size of the bread.

12 Claims, 3 Drawing Sheets

(56) References Cited

U.S. PATENT DOCUMENTS

| | | | |
|---|---|---|---|
| 2,254,105 A * | 8/1941 | Kottmann | 83/751 |
| 2,632,551 A * | 3/1953 | Kottmann | 198/463.3 |
| 2,795,254 A | 6/1957 | Hill | |
| 3,036,408 A | 5/1962 | Hansen | |
| 3,145,745 A | 8/1964 | Benith | |
| 3,417,546 A | 12/1968 | Irwin | |
| 3,421,286 A | 1/1969 | Chambless, Jr. | |
| 3,421,287 A | 1/1969 | Sheets | |
| 3,451,192 A | 6/1969 | Irwin | |
| 3,538,671 A | 11/1970 | Wallace | |
| 3,556,316 A | 1/1971 | Marasso et al. | |
| 3,579,957 A | 5/1971 | Mills, Jr. et al. | |
| 3,638,521 A | 2/1972 | Marckx et al. | |
| 3,886,827 A | 6/1975 | McCarthy | |
| 4,463,627 A | 8/1984 | Zelle | |
| 4,671,048 A | 6/1987 | Rademacher | |
| 4,694,715 A | 9/1987 | Jongerius | |
| 4,961,488 A * | 10/1990 | Steeghs | 198/357 |
| 5,031,497 A | 7/1991 | Moshier et al. | |
| 5,450,941 A | 9/1995 | Loewenthal | |
| 5,477,662 A | 12/1995 | Rompa | |
| 5,743,071 A | 4/1998 | Wolthuizen | |
| 6,421,984 B1 | 7/2002 | Murgatroyd et al. | |
| 6,766,898 B2 | 7/2004 | Lessard et al. | |
| 7,506,750 B2 * | 3/2009 | Costanzo et al. | 198/779 |

FOREIGN PATENT DOCUMENTS

| | | |
|---|---|---|
| JP | 07-069439 A | 3/1995 |
| JP | 11-90890 A | 4/1999 |
| JP | 2008-068895 A | 3/2008 |

* cited by examiner

BREAD CONVEYING APPARATUS AND BREAD SLICING APPARATUS

BACKGROUND OF THE INVENTION

1. Field of the Invention

The present invention relates to a bread conveying apparatus for conveying the bread and to a bread slicing apparatus comprising the bread carrying apparatus. In particular, the present invention relates to a bread conveying apparatus that can feed out the bread in appropriate timing regardless of the size of the bread while keeping in constant the conveying speed of a driving system such as an endless revolving member for conveying the bread, and a bread slicing apparatus comprising such the bread carrying apparatus.

2. Description of the Related Art

Bread slicing apparatuses for slicing the loaf bread have been conventionally used. For example, JP Patent Application Laid Open No. 11-90890 discloses a loaf bread slicer. The loaf bread slicer comprises a plurality of endless blades that are wound around a pair of drums and revolved, and the endless blades are disposed spaced apart from each other by a predetermined distance so as to slice the loaf bread in a predetermined thickness. Further, in order to supply the loaf bread to the loaf bread slicer, there is provided a loaf bread conveyer unit comprising a conveyer (an endless revolving member) and the like. The loaf bread conveying unit introduces a three-loaf length of baked loaf bread into the loaf bread slicer with the baked loaf breads set in a lateral orientation, and the introduced loaf bread goes through the endless blades to be sliced in the predetermined thickness. The sliced loaf bread is conveyed to the next process by a discharge conveyer comprising a conveyer and the like.

In addition, a bread conveying apparatus such as the loaf bread conveying unit for conveying the loaf bread to the bread slicing apparatus such as the bread slicer is configured to vary the conveying speed of the bread conveying apparatus (for example, the number of loaves of bread that can be supplied per unit time) according to the slicing capacity of the bread slicing apparatus for slicing the bread that has been produced in the preceding process, or the conveying capacity of the discharge conveyer for discharging the bread that has been sliced by the bread slicing apparatus.

As mentioned above, in the conventional bread conveying apparatus for conveying the bread to the bread slicing apparatus, it is required to intermittently operate the bread conveying unit in order to control the timing of introducing the bread to the endless blades and the timing of conveying the bread sliced by the endless blades to the discharge conveyer for discharging it from the bread slicing apparatus. Therefore, it may be possible to provide control means of the bread conveying apparatus, a sensor for detecting the presence/absence of the bread close to the bread slicing apparatus and the discharge conveyer, and a control mechanism for the acceleration and deceleration of the bread conveying apparatus in response to the result detected by the sensor.

However, there are problems that such the control itself is difficult and the arrangement of the bread conveying apparatus and the bread slicing apparatus comprising such the bread conveying apparatus will be complicated.

SUMMARY OF THE INVENTION

The present invention is provided to address the above situation. That is, the purpose of the present invention is to provide a bread conveying apparatus having a simple arrangement that can convey the bread in appropriate timing without requiring the complicated control and to provide a bread slicing apparatus comprising such the bread conveying apparatus.

In order to solve the above problems and achieve the purposes, a bread conveying apparatus of the present invention comprises: a flight conveyer including a first flight for urging a bread, an endless revolving member on which the first flight is mounted, and a driving member and a driven member, the endless revolving member being wound around the driving member and driven member; a rail extending along a conveying path of the bread and supporting the first flight; and a rail size setting unit for setting a length of the rail with respect to an extending direction of the conveying path, wherein the length of the rail with respect to the conveying direction is set by the rail size setting unit based on a size of the bread.

In order to solve the above problems and achieve the purposes, a bread slicing apparatus of the present invention comprises: the bread conveying apparatus mentioned above; a bread slicing cutter disposed downstream the flight conveyer along the conveying path; and a discharge conveyer for conveying the sliced bread, the discharge conveyer disposed downstream the bread slicing cutter along the conveying path.

It is noted that, throughout the present specification, a region where the endless revolving member travels along the conveying direction is defined as a forward path, and a region where the endless revolving member travels in the opposite direction to the conveying direction is defined as a backward path.

The bread conveying apparatus according to the present invention comprises the rail size setting unit that can change the length of the rail with respect to the conveying direction that supports the first flight for urging the bread, so that the distance along which the rail supports the first flight can be changed. Thus, the present invention can provide the bread conveying apparatus that can convey the bread in appropriate timing regardless of the size of the bread while keeping the conveying speed at a driving mechanism in constant and can provide the bread slicing apparatus comprising such the bread carrying apparatus.

Further, the present invention eliminates the sensor for detecting the position of the bread and the complex control mechanism for the acceleration and deceleration of the endless revolving member of the bread conveying apparatus, thereby providing the bread conveying apparatus and the bread slicing apparatus comprising that bread conveying apparatus with a simple arrangement.

Further features of the present invention will become apparent from the following description of exemplary embodiments with reference to the attached drawings.

DESCRIPTION OF THE EMBODIMENTS

Figure 1:
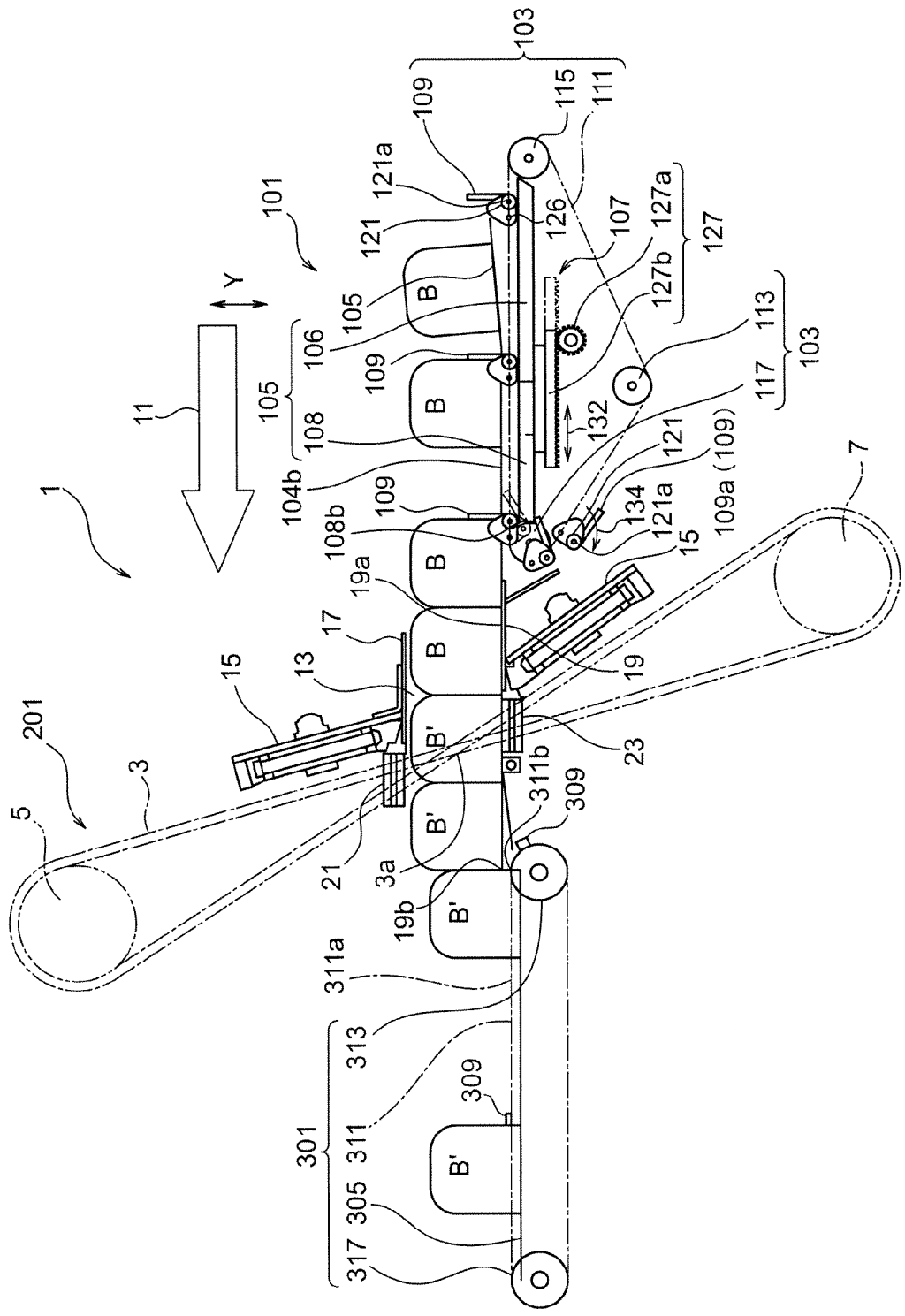
FIG. 1 is a side view that schematically shows primary components of a loaf bread slicing apparatus according to an embodiment.

By referring to the drawings, below will be described a loaf bread slicing apparatus according to an embodiment where a bread conveying apparatus and a bread slicing apparatus according to the present invention are applied. It should be noted that the preset invention is not limited to this embodiment.

Figure 2:
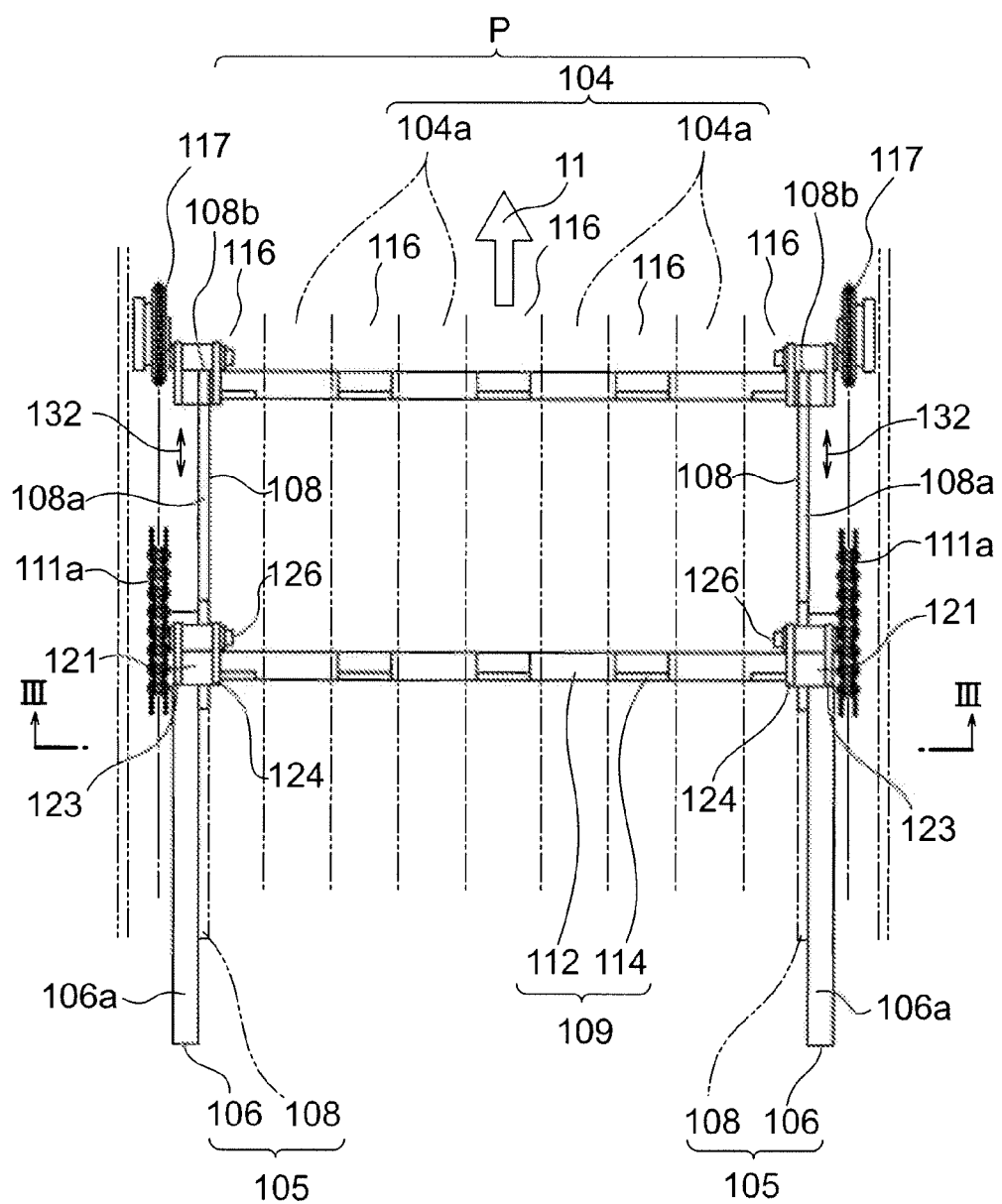
FIG. 2 is a plane view of a flight conveyer of the loaf bread slicing apparatus of FIG. 1.
Figure 3:
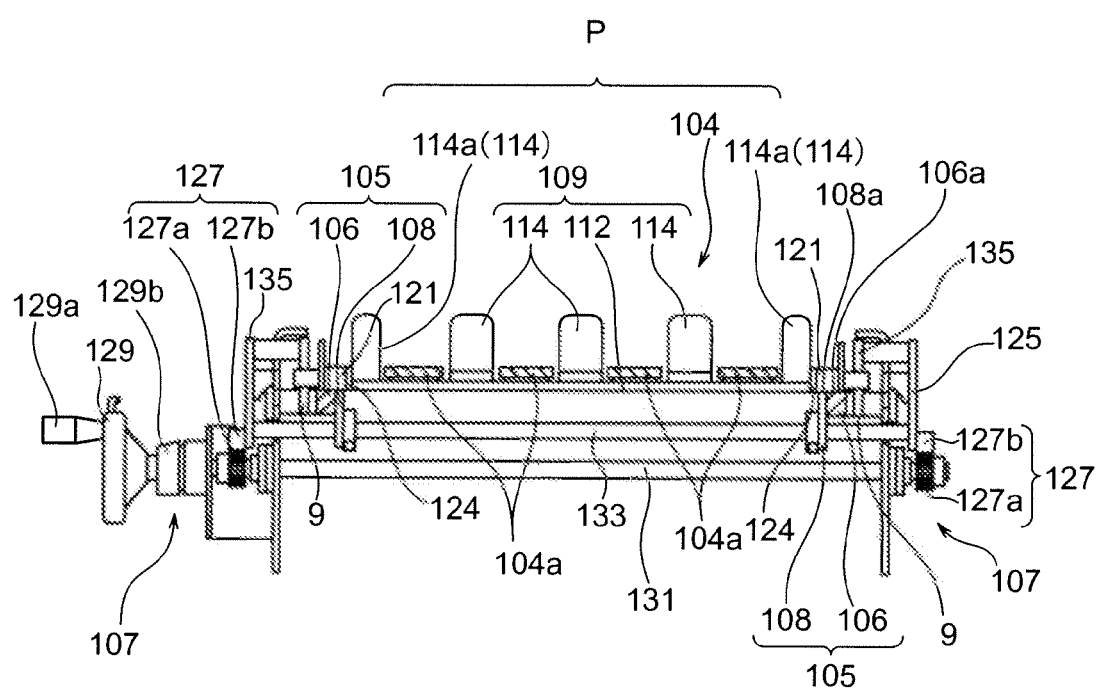
FIG. 3 is a cross section view taken along a line III-III in FIG. 2.

FIG. 1 is a side view that schematically shows the primary components of a loaf bread slicing apparatus 1 according to the embodiment; FIG. 2 is a plane view of a bread conveying unit 101 of the loaf bread slicing apparatus 1 of FIG. 1; and FIG. 3 is a cross section view taken along the line in FIG. 2. It is noted that, for clarity, frames and the like for mounting an upper drum 5 and a lower drum 7 around which endless blades 3 are rotatably wound are omitted from FIG. 1. Also, a handle 129 shown in FIG. 3 is omitted from FIG. 2.

The bread slicing apparatus 1 mainly comprises a bread slicing unit 201 for slicing the loaf bread; a bread conveying apparatus, that is, the bread conveying unit 101 for supplying a loaf bread B to the bread slicing unit 201; and a discharge conveyer 301 for conveying the sliced loaf bread B' to the subsequent process for bagging the loaf bread B' sliced by bread slice unit 201.

The bread conveying unit 101 comprises a flight conveyer 103; rails 105; and a rail size setting unit 107. The flight conveyer 103 extends in the width direction of a carrier 104 constituting a conveying path P where the loaf bread B passes (see FIGS. 2 and 3) and comprises a first flight 109 for urging the loaf bread B; an endless revolving member 111 on which the first flight 109 is mounted under the carrier 104 (downward in the direction shown by the arrow Y in FIG. 1); and sprockets, i.e., a first driving member 113 and a first driven members 115 and 117 around which chains 111a are wound, wherein the chains 111a are mounted on both ends in the width direction of the endless revolving member 111. In addition, the endless revolving member 111 has a well known structure where a plurality of flat plates, which are made of metal or resin, are joint to each other by pins, links, and the like.

The carrier 104 comprises a plurality of plate parts 104a, and constitutes the conveying path P for guiding the loaf bread B to the bread slicing unit 201. The plate parts 104a are spaced apart from each other by an equal interval in the width direction of the conveying path P (the left-right direction in FIG. 2), and extend in parallel to each other on the same plane. Between the adjacent plate parts 104a, flight projection openings 116 are formed that are the rectangular penetrated openings in the plane view. Further, the downstream of the carrier 104 (the left to the conveying direction (of the arrow 11) shown in FIG. 1) extends in the horizontal direction, and the upstream of the carrier 104 (the right to the conveying direction (of the arrow 11) shown in FIG. 1) extends with slightly inclining upward.

As shown in FIG. 2 and FIG. 3, the first flight 109 comprises a flight body 112 and protruded portions 114 connected to the flight body 112. A plurality of flight bodies 112 are mounted on the endless revolving member 111 in the circumference direction by an equal interval, and extend across the conveying path P in the right-left direction shown in FIG. 3. As shown in FIG. 2, the protruded portion 114 protrudes upward the vertical direction under the state where the flight body 112 is supported by the rails 105. Furthermore, a plurality of protruded portions 114 are provided spaced apart from each other by equal interval in the longitudinal direction of the first flight 109. In addition, the position of the protruded portions 114 and the flight projection openings 116 formed between the plate parts 104a are positioned so as to be mutually aligned, and the size of the protrusion portion 114 of the first flight 109 disposed under the carrier 104 is determined so as to protrude upward the carrier 104 through the flight projection opening 116.

Further, the protruded portions 114a which are disposed at both ends of the flight body 112 are shorter in width (the size along the left-right direction shown in FIG. 2) than the other protruded portions. However, the size and the shape of the protruded portion 114 (114a) may be modified as long as it can urge the loaf bread B and move it on the carrier 104.

Further, as shown in FIG. 3, both ends of the flight body 112 of the first flight 109 are connected to the free rollers 121, respectively. Further, in the side view (see FIG. 1), latch plates 123 having a triangle shape with round corners are disposed outside the free roller 121 with respect to the longitudinal direction of the flight body 112, so that the movement of the free roller 121 outward the longitudinal direction of the flight body 112 is restricted.

On the other hand, the movement of the free roller 121 inward the longitudinal direction of the flight body 112 is restricted by a regulation plate 124 fixed to the flight body 112. That is, the free roller 121 is attached to each end of the flight body 112 so as to be interposed between the latch plate 123 and the regulation plate 124.

Further, a rotation center 121a of the free roller 121 is disposed at a portion close to one of the corners of the latch plate 123. The portion close to the corner of the latch plate 123 and the regulation plate 124 are connected to the endless revolving member 111 via a pivot shaft 126, so that the latch plate 123 and the regulation plate 124 are adapted to pivot together about the pivot shaft 126. That is, the first flight 109 is swingably about the pivot shaft 126.

Further, as shown in FIG. 1, the chain 111a (see FIG. 2) mounted on each end of the endless revolving member 111 is wound around the first driven member (upstream driven sprocket) 115 disposed upstream the conveying direction (shown by the arrow 11) of the conveying path P, the first driven member (downstream driven sprocket) 117 disposed downstream, and the driving member (driving sprocket) 113 disposed between the first driven members 115 and 117. Therefore, when the rotation force from the drive source such as a motor (not shown) is applied to the driving member 113, the endless revolving member 111 rotates in the direction of the arrow 11.

Further, in FIG. 1, three first flights 109 which are close to each other near the first driven member 117 are shown for the purpose of illustrating the position changes when the first flight 109 passes over the first driven member 117. Therefore, in the bread conveying unit 101 and the bread slicing apparatus 1 of the present embodiment, the first flights 109 are disposed by an equal interval in the circumference direction of the endless revolving unit 111 as mentioned above. However, the interval by which the first flights are arranged with respect to the endless revolving member 111 can be changed depending on the intended use.

Each of the rails 105 of the present embodiment comprises a fixed rail member 106 and a movable rail member 108. The fixed rail member 106 is a member whose cross section is a quadrilateral fixed to a frame 9 of the bread slicing apparatus 1 (see FIG. 3) through a fixing part. The movable rail member 108 is a plate-like member that is disposed slidably with respect to the fixed rail member 106 in the front-back direction of the drawing sheet of FIG. 3. In the present embodiment, a pair of the fixed rail member 106 and the movable rail member 108 are disposed at both ends of the conveying path P. Top surfaces 106a and 108a of the fixed rail member 106 and the movable rail member 108 are disposed on the same plane, and the free roller 121 connected to the first flight 109 is adapted to slide on the top surfaces 106a and 108a. In addition, the fixed rail member 106 and the movable rail member 108 have an overlapping region where they partially overlap with respect to the conveying direction P.

One of a concave portion having a T-shaped cross section and a convex portion having a T-shaped cross section is provided to one of the surfaces where both rail members 106 and 108 are contacted to each other, and the other of the concave portion having a T-shaped cross section and the convex portion having a T-shaped cross section is provided to the other of the surfaces where both rail members 106 and 108 are contacted to each other, which allows the fixed rail member 106 and the movable rail member 108 to be fixed slidably to each other.

Further, the movable rail member 108 is connected to the rail size setting unit 107 for adjusting the amount of expansion and contraction of the movable rail member 108. The rail size setting unit 107 extends across the conveying path P, and comprises a rail drive shaft 133 fixed to a pair of the movable rail members 108; rack pinion mechanisms 127 connected via rail drive support members 135 that support both ends in the longitudinal direction of the rail drive shaft 133; and a rotation handle 129 for applying the rotation force to the rack pinion mechanisms 127. In addition, the rotation handle 129 is provided with a handle 129a that the user can grasp.

The rack pinion mechanism 127 extends across the conveying path P, and comprises a pair of gears (pinions) 127a that are mounted on the rotation shaft 131 rotatably supported by the frame 9 and a pair of racks 127b that are the plate-like member spirally threaded for converting the rotation motion of the gear 127a into the linear motion. The rack extends along the conveying path P.

When the user grasps the handle 129a to rotate the rotation handle 129, the rotation motion of the rotation handle 129 is transmitted to the rotation shaft 131. This rotation motion is converted into the linear motion (the direction of the arrow 132 shown in FIGS. 1 and 2) of the rack 127b via the gear 127a fixed to the rotation shaft 131. Since the rack 127b is fixed to the rail drive shaft 133 via the rail drive support member 135, the movable rail member 108 is moved in the direction of the arrow 132 by the linear motion of the rack 127b. In addition, a scale indicating the amount of expansion and contraction of the movable rail member 108 is provided on a cover 129b attached to one end of the rotation shaft 131. Therefore, the user can set the desired amount of expansion and contraction of the movable rail member 108 according to the scale on the cover 129b.

The operations of the rail 105, the rail size setting unit 107, and the flight conveyer 103 as arranged above will be described. When the first flight 109 of the flight conveyer 103 is moving on the forward path of the conveyer path P after passing by the first driven member 115, the free roller 121 travels on the top surface 106a of the fixed rail member 106. In the overlapping region of the fixed rail member 106 and the movable rail member 108, the free roller 121 passes over the top surface 106a of the fixed rail member 106 and the top surface 108a of the movable rail member 108, and then reaches a front end portion 108b of the movable rail member 108. Once the free roller 121 has passed by the front end portion 108b of the movable rail member 108, the free roller 121 is released from the support by the movable rail member 108 and the first flight 109 pivots around the pivot shaft 126. Since the pivot shaft 126 is positioned downstream the conveying direction (at the left side in FIG. 1) with respect to the center of gravity, the first flight 109 rotates in the direction of the arrow 134 shown in FIG. 1 by its own weight.

Subsequently, the first flight 109 passes through the backward path of the conveyer path P to move toward the driven member 115 while the protruded portion 114 of the first flight 109 of FIG. 1 is inclined with respect to the vertical direction. Afterwards, as described above, the following operations again start: once the free roller 121 has passed by the first (upstream) driven member 115, the free roller 121 is supported by the fixed rail member 106, and the first flight 109 moves in the conveying direction (shown by the arrow 11) with the protruded portion 114 extending upward in the vertical direction.

Further, the position of the front end portion 108b of the movable rail member 108, that is, the position (discharge position) where the urging force to the loaf bread B by the first flight 109 is released is adjusted by the rail size setting unit 107 according to the timing to introduce the loaf bread B to the bread slicing unit 201 described later, or the timing to convey the sliced loaf bread B' to the second flight 309 of the discharge conveyer 301. As such, the discharging position of the loaf bread B can be flexibly changed by the rail size setting unit 107, which eliminates the complicated control such as detecting the position of the sliced loaf bread B' and intermittently operating the endless revolving member 111 of the flight conveyer 103. Therefore, in the arrangement where the drive unit 113 is operated in a constant speed, the timing for discharging the loaf bread B can be properly changed.

Next, the bread slicing unit 201 will be described by referring to FIG. 1. The bread slicing unit 201 comprises a bread introducing path 13 through which the loaf bread B is introduced; an upper drum 5 and a lower drum 7 disposed above and below the bread introducing path 13; a plurality of endless blades 3 wound diagonally across the upper drum 5 and the lower drum 7; and an upper and lower guide pins 21 and 23 for supporting the endless blades 3 so that the endless blades 3 can revolve at a predetermined position. The bread introducing path 13 is structured in a tunnel-like shape by a top plate 17 and a bottom plate 19 that define the size with respect to the upper-lower direction of the bread introducing path 13 in FIG. 1, and side plates (not shown) that define the size with respect to the front-back direction (penetrating the drawing sheet) in FIG. 1. The top plate 17 and the bottom plate 19 are fixed to the slicing unit frame 15 constituting the frame member of the bread slicing apparatus 1. In addition, a top surface 19a of the bottom plate 19 and a top surface 104b in the horizontal region of the carrier 104 are disposed so as to be formed on the same plane.

Further, the upper guide pin 21 and the lower guide pin 23 are fixed to the slicing unit frame 15 so as to be disposed above and below with respect to a cross point 3a where the endless blades 3 intersect, and are arranged so that the endless blades 3 can pass on a predetermined motion track. Furthermore, the cross point 3a is positioned within the bread introducing path 13.

A plurality of endless blades 3 are wound around both drums 5 and 7 with a predetermined interval to each other in the axial direction (the front-back direction of FIG. 1). Once the loaf bread B is introduced into the bread introducing path 13 when the endless blades 3 are rotating, the loaf bread B' sliced by the predetermined width is obtained.

The introduction of the loaf bread B into the bread introducing path 13 is made each time the first flight 109 of the flight conveyer 103 passes over the front end portion 108b of the movable rail member 108. Then, the loaf bread B urged by the first flight 109 immediately before passing by the front end portion 108b pushes out another loaf bread B that has already been supplied in the bread introducing path 13, and the pushed out loaf bread B travels toward the cross point 3a of the endless blades 3. Finally, when the loaf bread B goes through the cross point 3a, it is sliced.

The discharge conveyer 301 is disposed downstream the bread slicing unit 201 with respect to the conveying direction 11 in FIG. 1. The discharge conveyer 301 comprises a second driven member 313 disposed upstream the conveying direction 11; a second driving member 317 rotated by the drive source such as a motor (not shown); and an endless revolving member 311 that is wound around the second driven member and the second driving member 317 and transmits the rotation force of the second driving member 317.

Further, second flights 309 are mounted on the second endless revolving member 311 by an equal interval in its circumference direction. The second flight 309 is a stick-like member of a quadrilateral shape in the side view, and extends across the bread introducing path 13. The sliced loaf bread B' is urged by the second flight 309. In addition, the width of the second endless revolving member 311 is determined to be the same as that of the conveying path P (i.e., the introducing path 13) of the flight conveyer 103. In addition, the second driven member 313 and the second driving member 317 are disposed at both ends in the width direction of the second endless revolving member 311, respectively, and thus the second endless revolving member 311 is revolved.

A carrier tray 305 constituting the conveying direction P for the sliced loaf bread B' is disposed under the forward path 311a of the endless revolving member 311. The carrier tray 305 extends in slightly lower position than the bottom plate 19 of the bread introducing path 13. Therefore, the sliced loaf bread B' falls onto the carrier tray 305 after passing by the end portion (the end portion 19b of the bottom plate 19) of the bread introducing path 13.

In the discharge conveyer 301 as arranged above, when the second driving member 317 is rotated at a predetermined rotation speed, the endless revolving member 311 is revolved in the conveying direction (shown by the arrow 11) and the second flight 309 is moved in the conveying direction (shown by the arrow 11). The second flight 309 urges the sliced loaf bread B' in the conveying direction (shown by the arrow 11) and moves the sliced loaf bread B' to the next process.

The introduction of the sliced loaf bread B' to the discharge conveyer 301 is made by that the above described flight conveyer 103 sequentially pushes out the loaf bread B. That is, the timing that the sliced loaf bread B' is discharged from the bread introducing path 13 to the discharge conveyer 301 will be defined by the discharging timing by the discharge conveyer 301. Thus, the front end portion 108b of the movable rail member 108 is positioned by the rail size setting unit 107 such that one sliced loaf bread B' is urged by each second flight 309 mounted on the second endless revolving member 311 that is revolving.

The positioning of the front end portion 108b of the movable rail member 108 is made by the rail size setting unit on the basis of any of the following information or any combination thereof: the interval of the adjacent first flights 109, the distance between the front end portion 108b and the rear end portion 311b of the second endless revolving member 311, the width (the size in the left-right direction in FIG. 1) of the loaf bread B used in the present embodiment of FIG. 1, the interval of the adjacent second flights 309, the speed of the first and the second endless revolving members 111 and 311, and so on. In the case of the loaf bread B used in the present embodiment, the front end portion 108b of the movable rail member 108 is positioned such that three loaves of the loaf bread B and one loaf of the sliced loaf bread B' are placed within the bread introducing path 13.

Each of the rails 105 of the present invention comprises the fixed rail member 106 and the movable rail member 108 that can move away and toward the fixed rail member 106. However, the present invention is not limited to this arrangement, that is, the arrangement where multiple movable rail members are combined or the arrangement where multiple movable rail members and multiple or single fixed rail member are combined are also possible as long as the length can be changed with respect to the conveying direction (shown by the arrow 11) of the loaf bread. Furthermore, the movable rail member and the fixed rail member can be arranged with a fixed outer cylinder and a movable inner cylinder mounted inside the outer cylinder instead of the arrangement of the present embodiment where the movable rail member and the fixed rail member are disposed adjacent to each other.

Furthermore, the inclined portion of the carrier 104 of the present embodiment is arranged such that the carrier 104 is set to appropriate height with respect to the apparatus arranged for the preceding process of the bread conveying unit 101. That is, it is possible to arrange the carrier not only to be inclined with respect to the horizontal direction but also to be horizontally arranged, and can be thus properly arranged depending on the apparatus of the subsequent process or the preceding process or the desired shape of the conveying path.

While the rack pinion mechanism is employed for the movable away-and-toward mechanism of the movable rail in the present embodiment, the present invention is not limited to this arrangement. Further, the number of the driving member and driven member of the flight conveyer can be changed for an intended use.

Further, while the present embodiment is described by using the loaf bread of the rectangular solid shape, the present invention is not limited to the apparatus used for the loaf bread, and thus can be applied to the bread conveying apparatus for conveying the breads of various sizes and shapes and the bread slicing apparatus for slicing these breads.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-130433, filed Jun. 7, 2010, which is hereby incorporated by reference herein in its entirety.

What is claimed is:

1. A bread slicing apparatus, comprising:
   a bread conveying apparatus including:
      a flight conveyer comprising a first flight for urging a bread in a conveying direction on a conveying path, an endless revolving member on which the first flight is mounted through a pivot shaft, and a driving member and a driven member spaced apart from each other in the conveying direction, the endless revolving member being wound around the driving member and the driven member to revolve therearound;
      a fixed rail member and a movable rail member that is movable relatively to the fixed rail member, the fixed rail member and the movable rail member extending along the conveying direction and supporting the first flight to urge the bread; and
      a rail size setting unit for setting a position of front end portion of the movable rail member with resect to one disposed downstream with resect to the conveying direction, of the driving member and the driven member;
   a bread slicing cutter disposed downstream the flight conveyer along the conveying path; and a discharge conveyer for conveying the sliced bread, the discharge conveyer disposed downstream the bread slicing cutter along the conveying path, wherein the position of front end portion of the movable rail member with respect to one, disposed downstream with respect to the conveying direction, of the driving member and the driven member is set by the rail size setting unit based on a size, in the conveying direction, of the bread.

2. A bread slicing apparatus according to claim 1, wherein the discharge conveyer includes a second flight for urging the sliced bread, a second endless revolving member on which the second flight is mounted, a second driving member, and a second driven member, the second endless revolving member being wound around the second driving member and second driven member, and wherein the position of front end portion of the movable rail member with respect to one, disposed downstream with respect to the conveying direction, of the driving member and the driven member is set by the rail size setting unit based on a distance between the flight conveyer and the discharge conveyer.

3. A bread slicing apparatus according to claim 2, wherein the position of front end portion of the movable rail member with respect to one, disposed downstream with respect to the conveying direction, of the driving member and the driven member is set by the rail size setting unit based on a position of the second flight mounted on the discharge conveyer.

4. A bread slicing apparatus according to claim 1, wherein the first flight is provided with a roller rotatable on said fixed rail member and the movable rail member.

5. A bread slicing apparatus according to claim 4, wherein the first flight comprises a flight body, both ends of the flight body of the first flight being connected to the roller.

6. A bread slicing apparatus according to claim 5, further comprising:

a plurality of latch plates disposed outside the roller with respect to a longitudinal direction of the flight body to restrict a movement of the roller outward the longitudinal direction of the flight body.

7. A bread slicing apparatus according to claim 6, wherein the latch plates have a triangle shape with round corners.

8. A bread slicing apparatus according to claim 1, wherein, when the first flight passes a front end portion of the movable rail member, the first flight is disengaged from the movable rail member for rotating away from the bread.

9. A bread slicing apparatus according to claim 8, wherein, when the first flight passes the front end portion of the movable rail member, the first flight is rotated away from the bread in a direction opposed to the conveying direction.

10. A bread slicing apparatus according to claim 1, wherein, when the first flight passes a front end portion of the movable rail member, the first flight is rotated away from the bread in a direction opposed to the conveying direction.

11. A bread slicing apparatus according to claim 1, wherein the first flight pivots around the pivot shaft.

12. A bread slicing apparatus according to claim 1, wherein the first flight is pivotally rotated away from the bread by a weight of the first flight.

* * * * *